United States Patent
Ladislao et al.

(10) Patent No.: US 9,868,431 B1
(45) Date of Patent: Jan. 16, 2018

(54) DRONE AND SEPARATE VEHICLE BODY THAT ARE ASSEMBLABLE TO FORM VEHICLE SUCH AS HOVERCRAFT

(71) Applicant: SPIN MASTER LTD., Toronto (CA)

(72) Inventors: Mark Ladislao, Hong Kong (CN); Conor Forkan, Toronto (CA)

(73) Assignee: SPIN MASTER LTD., Toronto (CA)

( * ) Notice: Subject to any disclaimer, the term of this patent is extended or adjusted under 35 U.S.C. 154(b) by 0 days.

(21) Appl. No.: 15/588,188

(22) Filed: May 5, 2017

(51) Int. Cl.
  *B60V 1/14* (2006.01)
  *B64C 39/02* (2006.01)
  *B60V 1/11* (2006.01)

(52) U.S. Cl.
  CPC ................... *B60V 1/14* (2013.01); *B60V 1/11* (2013.01); *B64C 39/024* (2013.01); *B64C 2201/027* (2013.01); *B64C 2201/108* (2013.01); *B64C 2201/12* (2013.01); *B64C 2201/165* (2013.01)

(58) Field of Classification Search
  CPC .......... B64C 2201/12; B64C 2201/027; B64C 2201/108; B64C 2201/165; B60V 1/11; B60V 1/14
  See application file for complete search history.

(56) References Cited

U.S. PATENT DOCUMENTS

| | | | |
|---|---|---|---|
| 4,080,922 A | 3/1978 | Brubaker | |
| 4,984,754 A * | 1/1991 | Yarrington | B60V 1/00 244/17.11 |
| 5,727,495 A | 3/1998 | Reslein | |
| 6,158,540 A | 12/2000 | Rice et al. | |
| 6,715,574 B1 * | 4/2004 | Bertelsen | B60V 1/11 180/122 |
| 8,657,053 B2 | 2/2014 | Novikov-Kopp | |
| 9,045,226 B2 | 6/2015 | Piasecki et al. | |
| 2007/0010159 A1 | 1/2007 | Butler et al. | |
| 2009/0008499 A1 | 1/2009 | Shaw | |
| 2009/0294573 A1 | 12/2009 | Wilson et al. | |
| 2011/0315806 A1 | 12/2011 | Piasecki et al. | |

(Continued)

FOREIGN PATENT DOCUMENTS

WO    02/060550 A1    8/2002

OTHER PUBLICATIONS

"Turn your broken Drone into a RC Hovercraft." YouTube video. Published to "Make Science Fun" YouTube channel on Mar. 3, 2016. Accessed from <https://www.youtube.com/watch?v=zp5mUUgg2_A>. (Year: 2016).*

*Primary Examiner* — Brian M O'Hara
*Assistant Examiner* — Michael B Kreiner
(74) *Attorney, Agent, or Firm* — Millman IP Inc.

(57) ABSTRACT

In one aspect, there is provided a combination vehicle system, including a drone and a hovercraft body. The drone has a plurality of motor-driven rotors and a controller. The hovercraft body defines a ground-facing chamber having a hover air inlet, and includes a mount for the drone. The drone is removably connectable to the mount in a mounted position so as to form a hovercraft. The controller is programmed to drive the plurality of rotors to maintain stable flight of the drone without the hovercraft body connected thereto. The controller is programmed to drive the first rotor to at least partially lift the hovercraft off a support surface and to drive the second rotor to propel the hovercraft along the support surface.

20 Claims, 9 Drawing Sheets

(56) References Cited

U.S. PATENT DOCUMENTS

| | | |
|---|---|---|
| 2015/0217837 A1 | 8/2015 | Szydlowski et al. |
| 2016/0167470 A1 | 6/2016 | Seydoux et al. |
| 2016/0176514 A1 | 6/2016 | Lavagen et al. |
| 2016/0375997 A1* | 12/2016 | Welsh ............... B64C 39/024 244/17.23 |
| 2016/0376000 A1* | 12/2016 | Kohstall ............. B64C 37/00 114/313 |

* cited by examiner

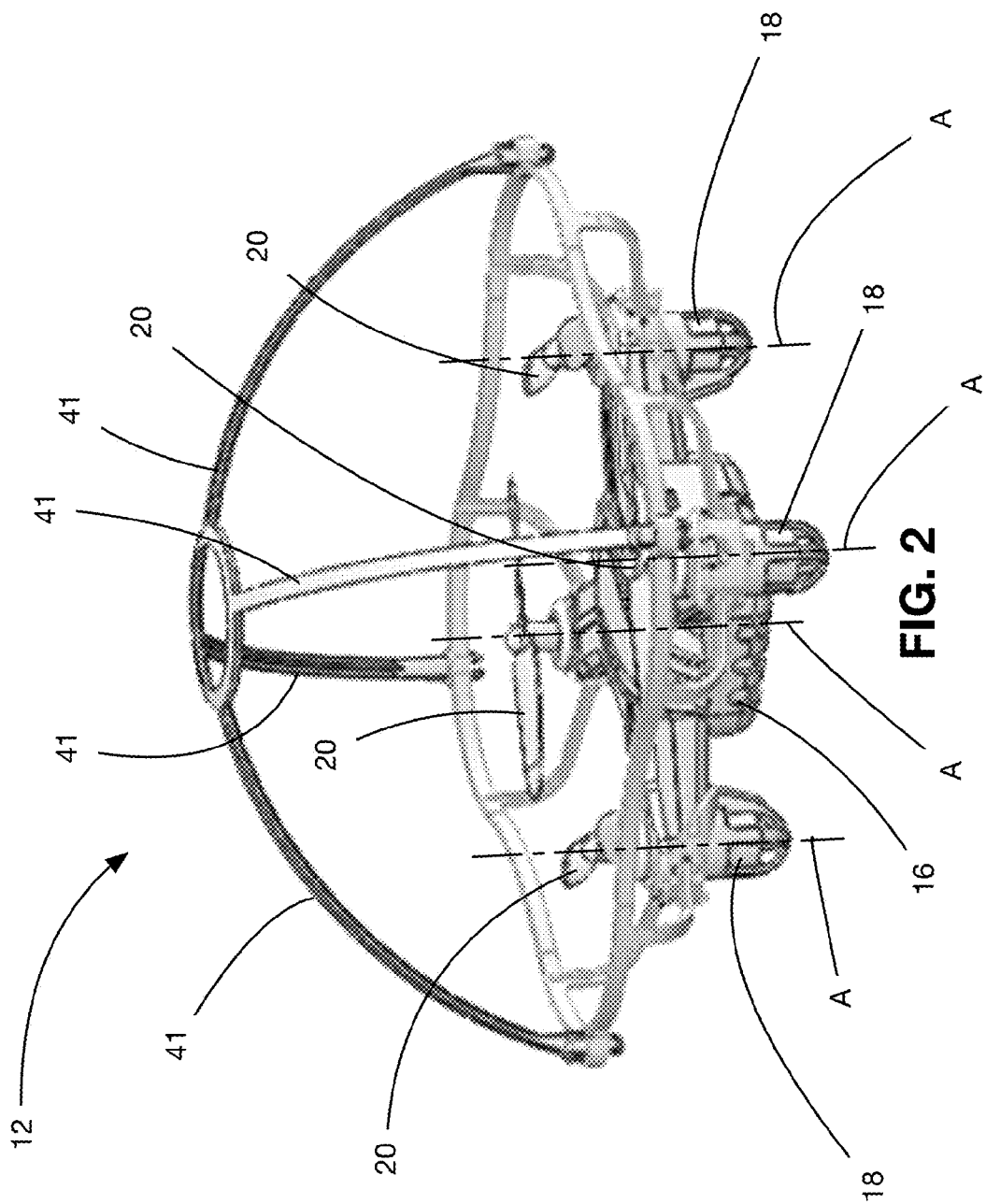

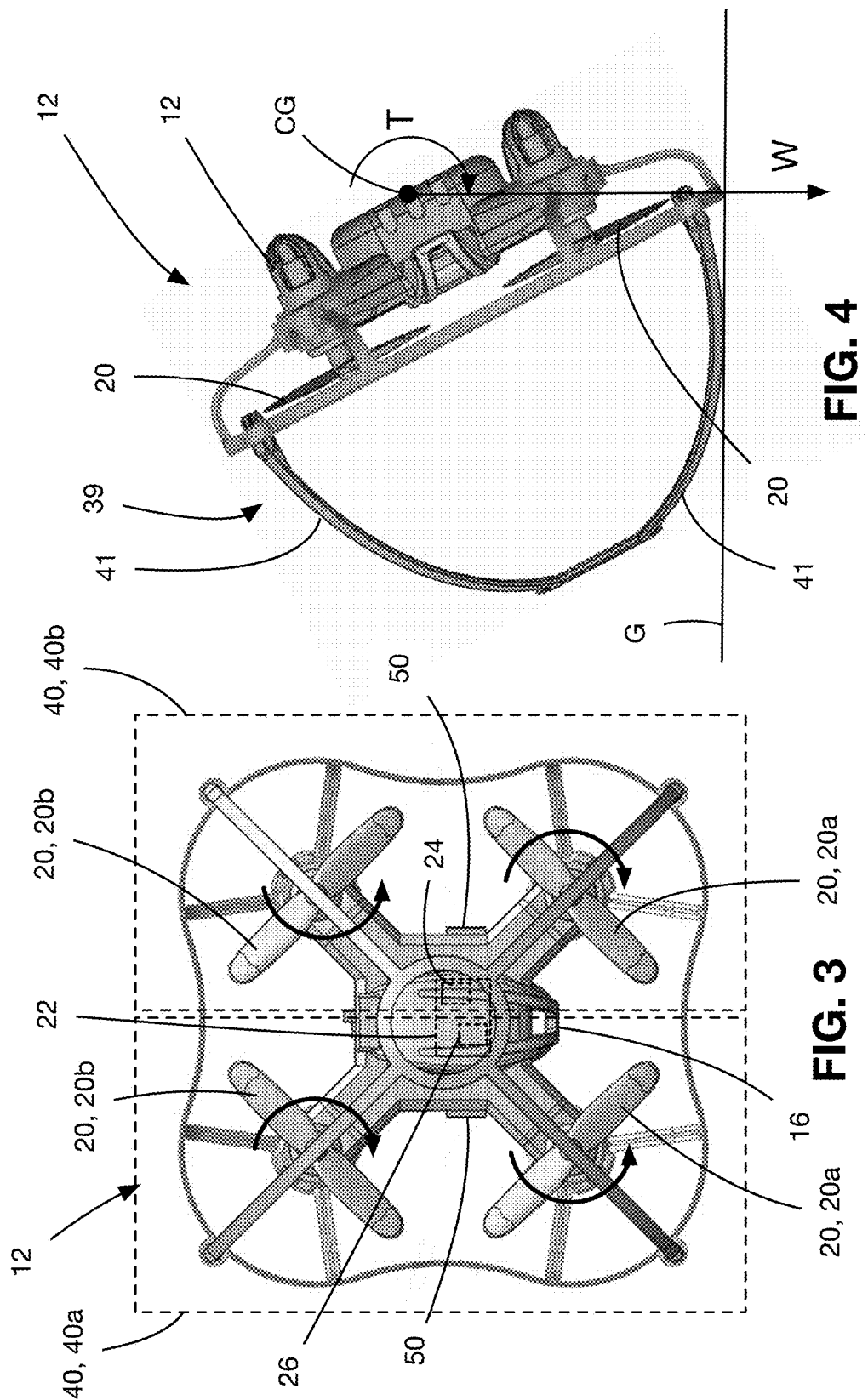

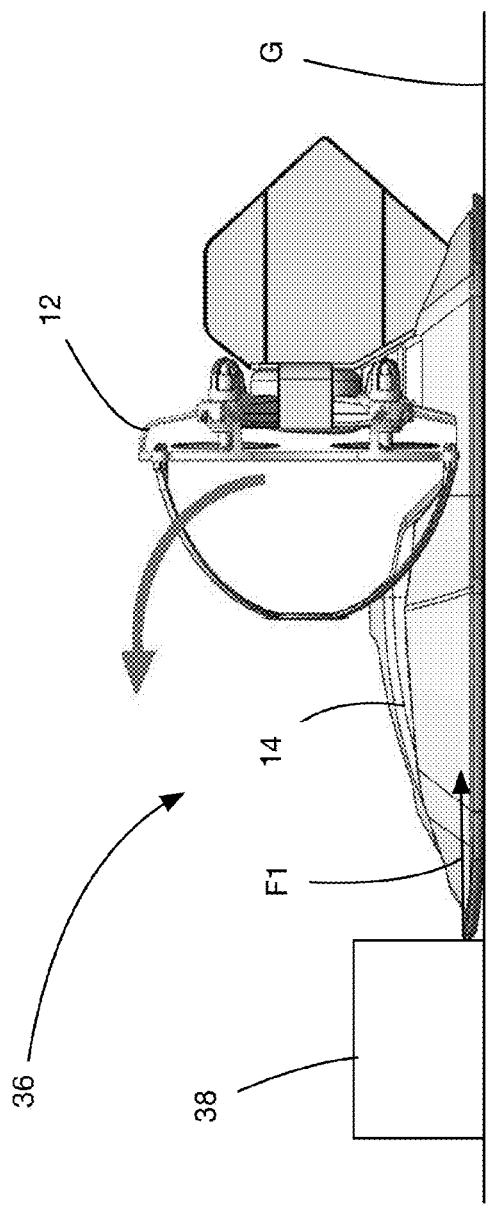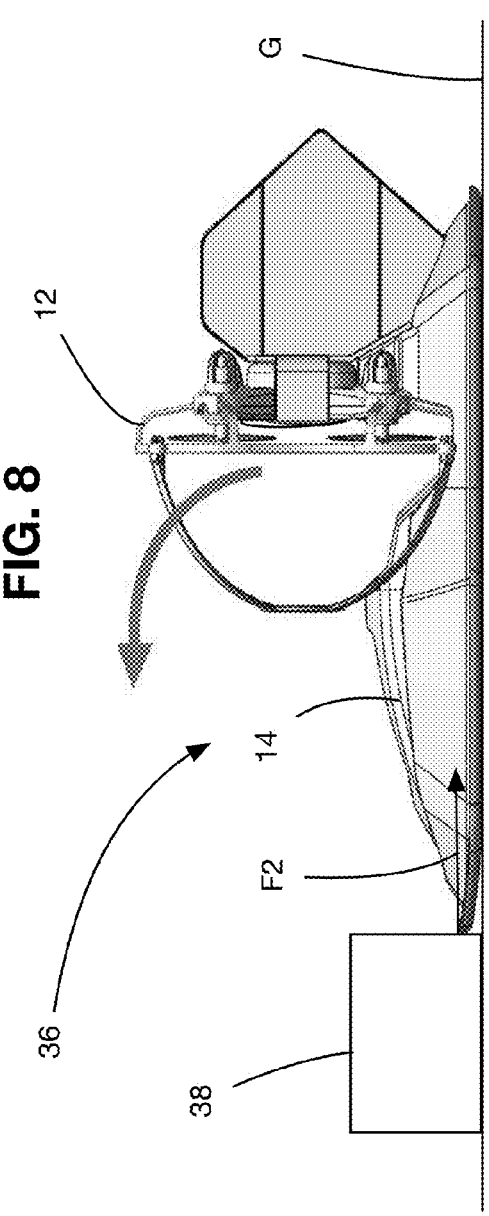

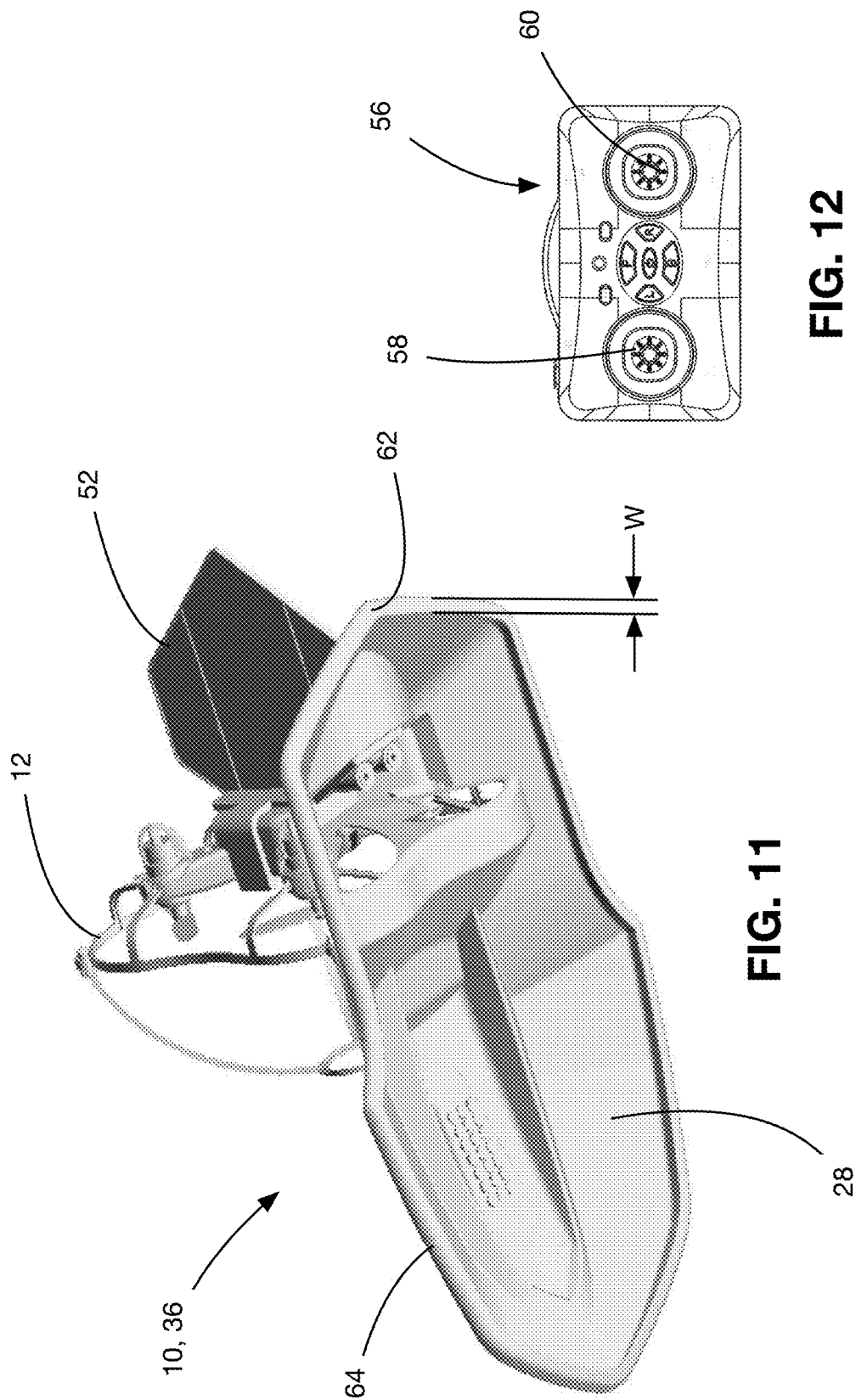

DRONE AND SEPARATE VEHICLE BODY THAT ARE ASSEMBLABLE TO FORM VEHICLE SUCH AS HOVERCRAFT

FIELD

The specification relates generally to assemblies formed by connecting a drone with a vehicle body to form different types of vehicle.

BACKGROUND OF THE DISCLOSURE

It is known to provide a drone that can be combined with a vehicle frame that is otherwise unpowered, to form a new vehicle such as a boat or an ice-travelling device. While such devices can be entertaining to use, there is a continuing need for further innovation so as to improve the user's experience with such vehicles and with the drone.

SUMMARY OF THE DISCLOSURE

In one aspect, there is provided a combination vehicle system, which includes a drone and a hovercraft body. The drone has a plurality of rotors, each of which is motor-driven. The drone further includes a controller that is operatively connected to the plurality of rotors. The hovercraft body defines a ground-facing chamber having a hover air inlet, and includes a mount for the drone. The drone is removably connectable to the mount in a mounted position so as to form a hovercraft in which a first rotor of the plurality of rotors is positioned in radial overlap with at least a portion of the hover air inlet and is oriented to drive air into the ground-facing chamber through the hover air inlet so as to at least partially lift the hovercraft body off a support surface, and in which a second rotor of the plurality of rotors is positioned without any radial overlap with the hover air inlet and is oriented to drive air to propel the hovercraft along the support surface. The controller is programmed to drive the plurality of rotors to maintain stable flight of the drone without the hovercraft body connected thereto. The controller is programmed to drive the first rotor to at least partially lift the hovercraft off a support surface and to drive the second rotor to propel the hovercraft along the support surface.

In another aspect, a combination vehicle system including a drone and a vehicle body is provided. The drone has a plurality of rotors, wherein each of the rotors is motor-driven. The drone further includes a controller is operatively connected to the plurality of rotors. The hovercraft body defines a ground-facing chamber and includes a mount for the drone. The mount includes a first clip structure, and the drone includes a second clip structure. The mount is shaped to releasably receive the drone in a first way in which the first and second clip structures engage one another to positively hold the drone in place such that at least a first axial force is necessary to dislodge the drone from the hovercraft body, and wherein the mount is shaped to releasably receive the drone in a second way in which the drone is held in the mount at least in part by friction such that at least a second axial force that is less than the first axial force is necessary to dislodge the drone from the hovercraft body. When the drone is mounted in the mount in each of the first and second ways, thereby forming a hovercraft, a first rotor from the plurality of rotors is oriented to drive air into the ground-facing chamber so as to at least partially lift the hovercraft off a support surface, and a second rotor from the plurality of rotors is oriented to drive air to propel the hovercraft along the support surface. The controller is programmed to drive the plurality of rotors to maintain stable flight of the drone when the drone is disconnected from the hovercraft body. The controller is programmed to drive the first rotor to at least partially lift the hovercraft off a support surface and to drive the second rotor to propel the hovercraft along the support surface.

In yet another aspect, a combination vehicle system including a drone, a vehicle body and a remote control is provided. The drone has a plurality of rotors, each of which is motor-driven. The drone further includes a controller that is operatively connected to the plurality of rotors. The hovercraft body defines a ground-facing chamber and including a mount for the drone, wherein the drone is removably connectable to the mount in a mounted position so as to form a hovercraft in which a first rotor from the plurality of rotors is oriented to drive air into the ground-facing chamber so as to at least partially lift the hovercraft off a support surface, and in which a second rotor from the plurality of rotors is oriented to drive air to propel the hovercraft along the support surface. The controller is programmed to drive the plurality of rotors to maintain stable flight of the drone when the drone is disconnected from the hovercraft body. The controller is programmed to drive the first rotor to at least partially lift the hovercraft off a support surface and to drive the second rotor to propel the hovercraft along the support surface. The remote control includes a first input member. The remote control and the controller are programmed such that actuation of the first input member by a first amount when the drone is separate from the hovercraft body and sitting in a first orientation causes the remote control to signal the controller, and in turn causes the controller to adjust speed of the first and the second rotor differently than actuation of the first input member by the first amount when the drone is connected to the hovercraft body and is sitting in a second orientation that is different than the first orientation.

In some embodiments, a drone may be integrally formed with a vehicle body to form a vehicle such as a hovercraft wherein the two elements (drone and vehicle body) are not separable from one another. In such embodiments, features unrelated to the concept of separability from one another may be novel and inventive relative to the prior art. The drone in such embodiments may have four rotors as the drone does in the figures contained herein.

In addition to the above aspects and embodiments, other aspects and embodiments of the present disclosure are contemplated to be novel and inventive over the prior art and may be claimed.

BRIEF DESCRIPTIONS OF THE DRAWINGS

For a better understanding of the various embodiments described herein and to show more clearly how they may be carried into effect, reference will now be made, by way of example only, to the accompanying drawings in which:

FIG. 2 is a perspective view of a drone shown in FIG. 1; and

FIG. 3 is a plan view the drone shown in FIG. 2;

FIG. 4 is a side elevation view of the drone shown inverted;

FIG. 8 is a side elevation view of the hovercraft colliding with a stationary object when the drone is mounted in the first way;

FIG. 9 is a side elevation view of the hovercraft colliding with the stationary object when the drone is mounted in the second way;

FIG. 11 is a perspective view of the underside of the hovercraft body; and

FIG. 12 is a plan view of a remote control that can be used to control the operation of the drone and the hovercraft formed by the drone and the hovercraft body.

DETAILED DESCRIPTION

Figure 1A:
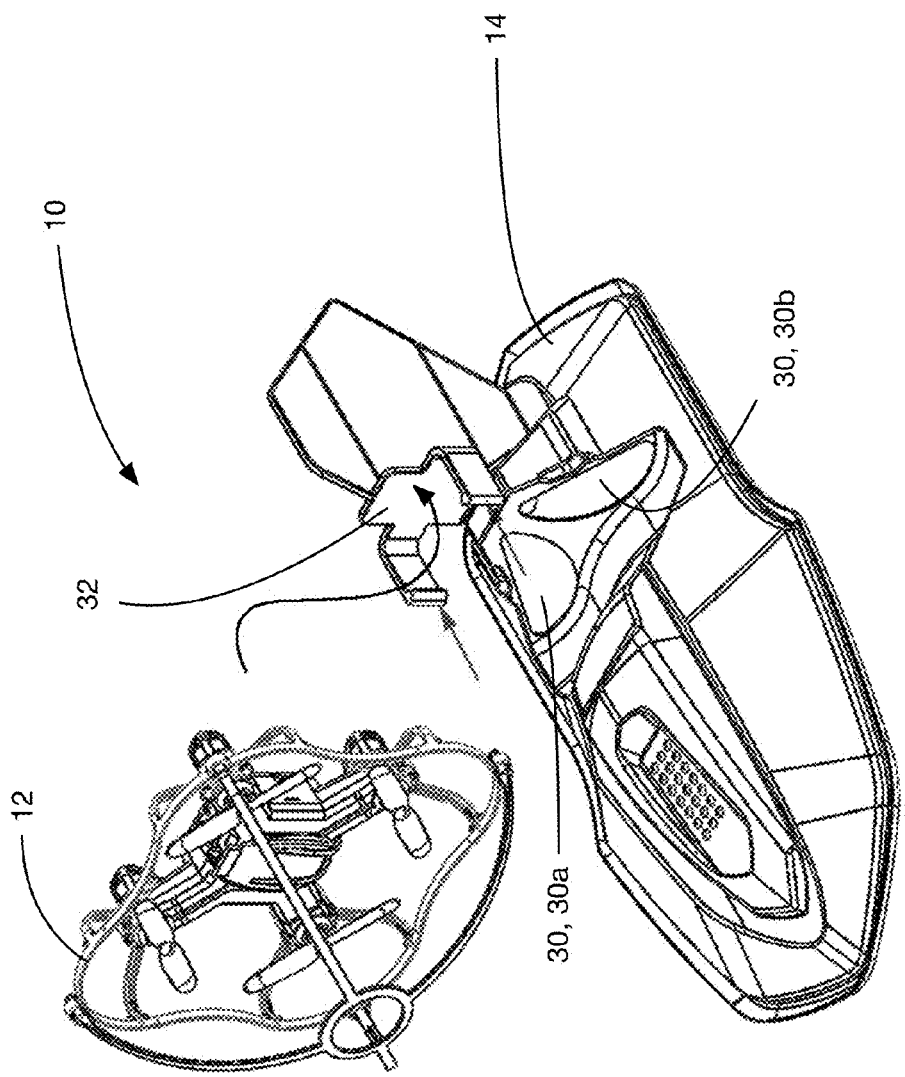
FIG. 1A is a perspective exploded view of a combination vehicle system in accordance with an embodiment of the present disclosure.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

Figure 1B:
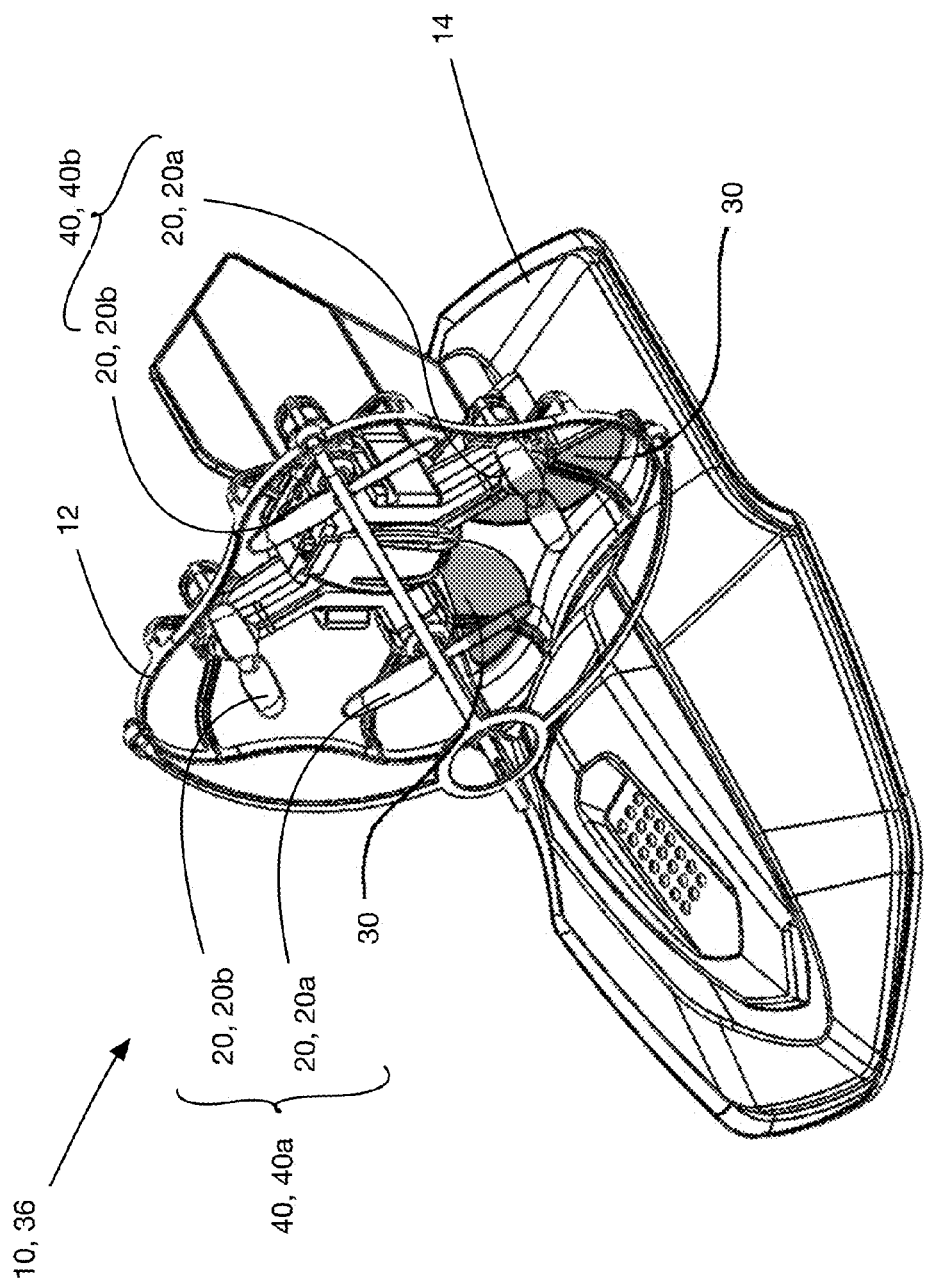
FIG. 1B is a perspective view of the combination vehicle system shown assembled in FIG. 1A.

A combination vehicle system 10 in accordance with an embodiment is shown in FIG. 1A and FIG. 1B. The combination vehicle system 10 includes a drone 12 and a secondary vehicle body 14 (which, in the present example, is a hovercraft body). With reference to FIGS. 2-4, the drone 12 has a drone body 16, that optionally has a front end 16f and a rear end 16r, and which holds a plurality of motors 18. The drone 12 further includes a plurality of rotors 20, each of which is motor-driven, and a controller 22 that is operatively connected to the plurality of rotors 20 (for example, by controlling the operation of the plurality of motors 18). In the example shown, the drone 12 has four rotors 20.

As is known in the art, the rotors 20 of the drone 12 may counterrotate in the sense that each rotor 20 rotates in the opposite direction to the rotors 20 immediately adjacent to it. As an example, the directions of rotation of the rotors 20 in the drone 12 may be as shown in FIG. 3. As can be seen, two of the rotors 20 rotate clockwise and two of the rotors 20 rotate counterclockwise. This counterrotation assists with stable flight. The controller 22 can increase or decrease the speeds of all four rotors 20 in order to cause the drone 12 to increase or decrease altitude. The controller 22 can increase the speeds of the two rotors 20 that rotate clockwise, or the speeds of the two rotors 20 that rotate counterclockwise, in order to cause the drone 12 to turn clockwise, or counterclockwise, as the case may be.

The drone 12 may further include an orientation sensor 24 that sends signals to the controller 22 related to the orientation of the drone 12. For example, the orientation sensor may be a 3-axis gyro. The drone 12 may further include a speed sensor 26 that sends signals to the controller 22 related to the speed of the drone 12. For example, the speed sensor 26 may be a 3-axis accelerometer.

The controller 22 may use signals from the orientation sensor 24 and from the speed sensor 26 to control the drone 12 so as to maintain stable flight of the drone 12. The controller 22 may use any suitable algorithm for the purpose of maintaining stable flight of the drone 12.

In the example shown, each of the rotors 20 is driven by an individually dedicated motor 18. In other words, there is one motor 18 for each rotor 20. It is alternatively possible, however, for the drone 12 to include a different drive arrangement in which one motor 18 is operatively connected (e.g. via a belt drive) to a plurality of rotors.

Figure 5:
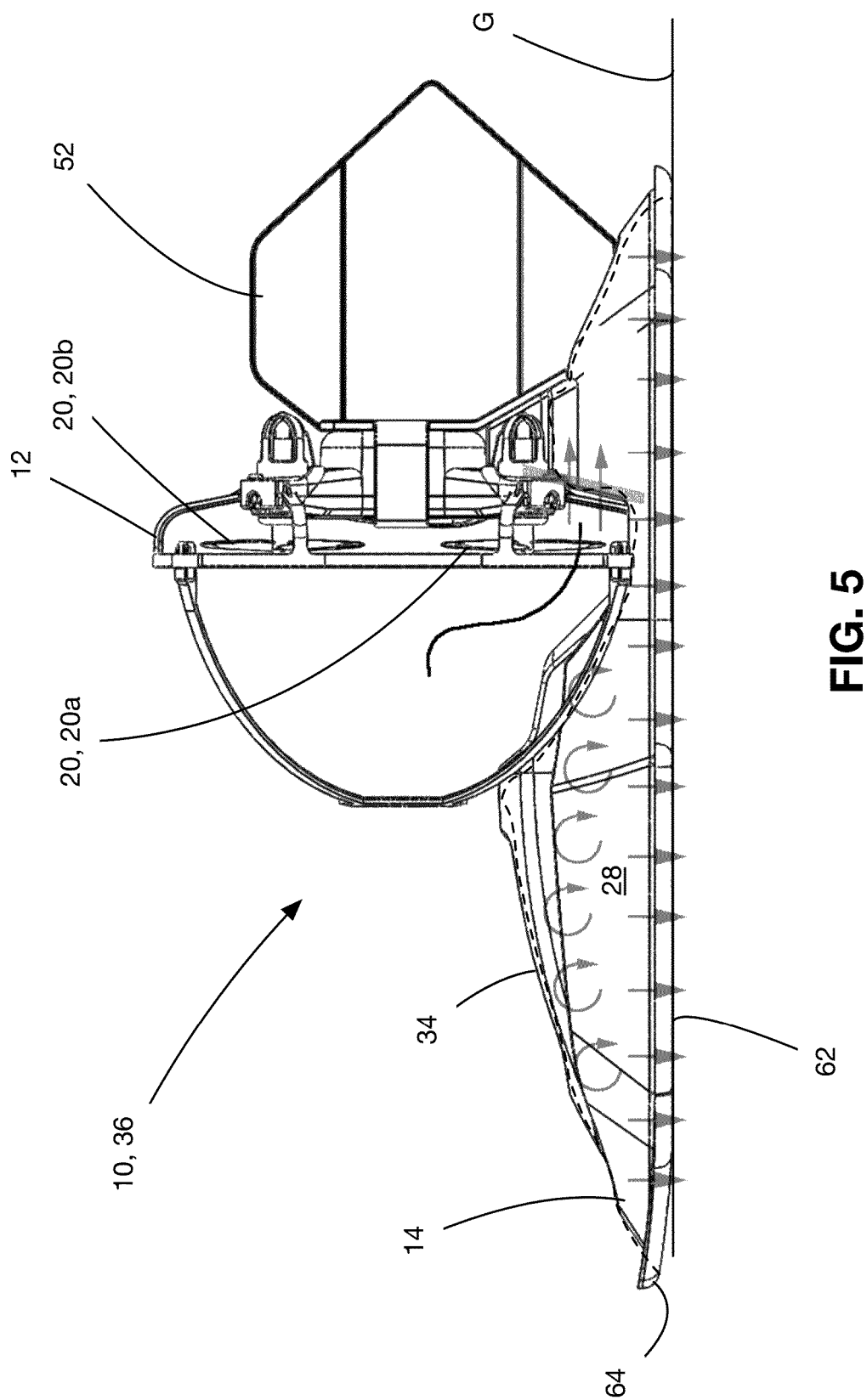
FIG. 5 is a side elevation view of a hovercraft formed by the drone and a hovercraft body.

Referring to FIG. 5, the hovercraft body 14 defines a ground-facing chamber 28 having a hover air inlet 30, and includes a mount 32 for the drone 12. In the embodiment shown, the hovercraft body 14 is a single layer that has an exterior face 34, and the hover air inlet 30 passes from the exterior face 34 into the ground-facing chamber 28. The mount 32, in the embodiment shown, is provided on the exterior face 34.

The drone 12 is removably connectable to the mount 32 in a mounted position (FIG. 1B) thereby forming a hovercraft 36. When in the mounted position, the drone 12 is positioned to drive air into the ground-facing chamber 28 so as to at least partially lift the hovercraft 36 off the support surface G and to drive air to propel the hovercraft 36 along a support surface G. In the example shown, in the mounted position, a first rotor 20a from the plurality of rotors 20 is oriented to drive air into the ground-facing chamber 28 so as to at least partially lift the hovercraft 36 off the support surface G, and a second rotor 20b from the plurality of rotors 20 is oriented to drive air to propel the hovercraft 36 along the support surface G. It is possible for the first rotor 20a to also contribute to propelling the hovercraft 36 along the support surface G in addition to driving air into the ground-facing chamber 28. Additionally, or alternatively, it is possible for the second rotor 20b to contribute to driving air into the ground-facing chamber 28 in addition to propelling the hovercraft 36 along the support surface G. In the particular example shown, the first rotor 20a drives air into the ground-facing chamber 28 and also drives air to propel the hovercraft 36 along the support surface G, while the second rotor 20b drives air to propel the hovercraft 36 along the support surface G only without driving air into the ground-facing chamber 28.

In the example shown, the first rotor 20a of the plurality of rotors 20 is positioned in radial overlap with at least a portion of the hover air inlet 30 and is oriented to drive air into the ground-facing chamber 28 through the hover air inlet 30 so as to at least partially lift the hovercraft 36 off a support surface G, and such that a second rotor 20b of the plurality of rotors 20 is positioned without any radial overlap with the hover air inlet 30 and is oriented to drive air to propel the hovercraft 36 along the support surface G.

In the example shown, the hover air inlet 30 includes two hover air inlet portions, including a first hover air inlet portion 30a and a second hover air inlet portion 30b. Additionally, the first rotor 20a and the second rotor 20b make up a first pair 40 of rotors 20, and the plurality of rotors 20 also includes a second pair 40 of rotors 20, which includes its own first rotor 20a and a second rotor 20b. The first and second pairs 40 are shown individually at 40a and 40b. The first rotor 20a from the first pair 40a overlaps with the first hover air inlet portion 30a, and the first rotor 20a from the second pair 40b overlaps with the second hover air inlet portion 30b. It can be seen that the first rotors 20a entirely overlap radially with the hover air inlet 30 in the present example.

For greater clarity 'radial overlap' refers to overlap in the radial plane of the rotors 20, which is the plane that is perpendicular to the axis of rotation of each rotor 20. The axis of rotation is shown at A for each rotor 20. It will be understood that the axis of rotation A for each rotor 20 need not be precisely parallel to the axes of rotation A of any of the other rotors 20.

In the example shown, the first rotors 20a are involved in at least partially lifting the hovercraft 36 off the ground during operation, and may, therefore, be referred to as lifting rotors. Additionally, in the example shown, all of the first and second rotors 20a and 20b are all involved in driving air to propel the hovercraft 36 along the support surface G and may thus be referred to as translation rotors.

Figure 6:
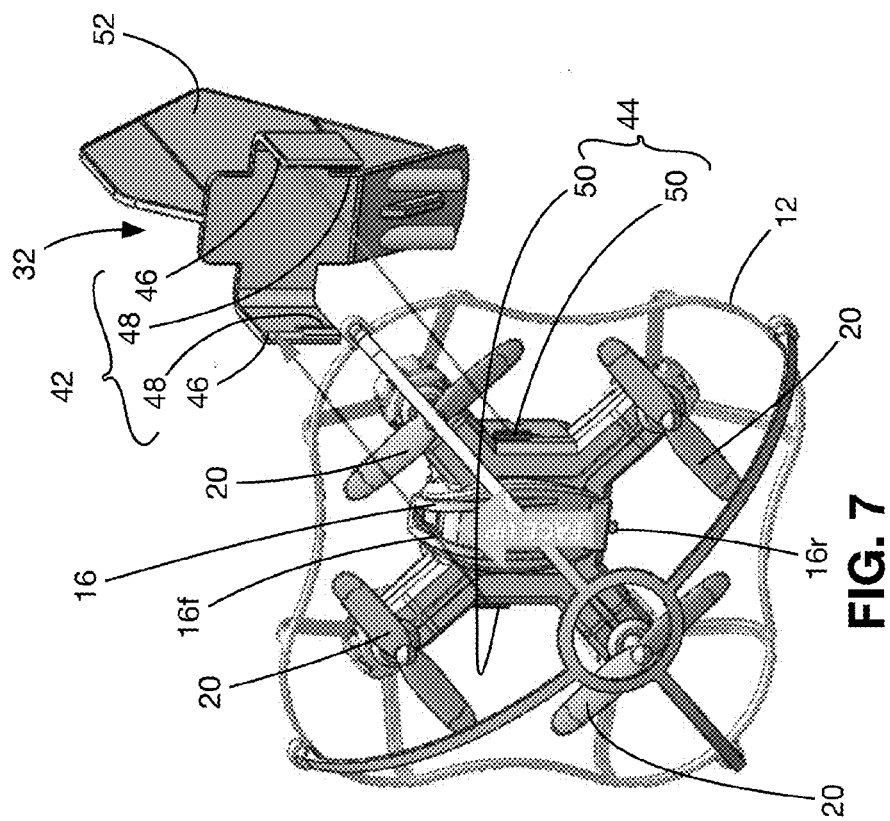
FIG. 6 is a perspective view showing the drone mounted to an optional mount in a first way.
Figure 7:
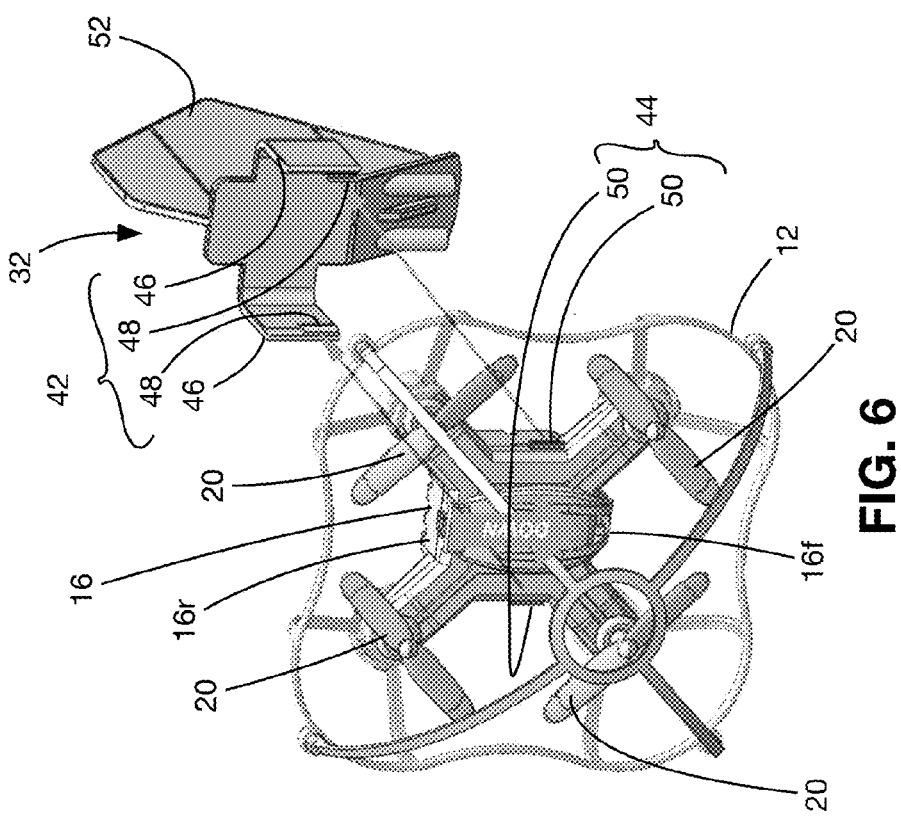
FIG. 7 is a perspective view showing the drone mounted to the optional mount shown in FIG. 6, in a second way.

The mount 32 (FIGS. 6 and 7) is configured to hold the drone 12 in any suitable way. Optionally, the mount 32 includes a first clip structure 42, and the drone 12 includes a second clip structure 44. The mount 32 is shaped to receive the drone 12 in a first way (FIG. 6) in which the first and second clip structures 42 and 44 engage one another to positively hold the drone 12 in place on the mount 32, which corresponds to the mounted position for the drone 12. The first clip structure 42 may include a pair of resilient arms 46 each of which has a first laterally extending shoulder 48 (laterally extending relative to the general axis of the arm 46), and the second clip structure 44 may include a pair of second shoulders 50 on the drone body 16 that are sized to receive the first shoulders 48.

Optionally, the mount 32 is shaped so as to receive the drone 12 in a second way (FIG. 7) in which the drone 12 is held in the mount 32 at least in part by friction (and optionally substantially only by friction). To achieve this, the drone 12 may be rotated 180 degrees and inserted so that the front end 16f of the drone body 16 faces up away from the hovercraft body 14 and the rear end 16r of the drone body 16 faces down into the hovercraft body 14. This is opposite to the mounting of the drone 12 in the first way, wherein the rear end 16r of the drone body 16 faces up away from the hovercraft body 14 and the front end 16f of the drone body 16 faces down into the hovercraft body 14.

When the drone 12 is mounted in either of the first or second ways it may be said to be mounted in a mounted position such that a first rotor 20a is positioned in radial overlap with at least a portion of the hover air inlet 30 and is oriented to drive air into the ground-facing chamber 28 through the hover air inlet 30 so as to at least partially lift the hovercraft 36 off the support surface G, and such that a second rotor 20b is positioned without any radial overlap with the hover air inlet 30 and is oriented to drive air to propel the hovercraft 36 along the support surface G. As can be seen, the rotors 20 that act as the first rotors 20a and therefore overlap with the hover air inlet 30 may be the rotors 20 at the rear end 16r of the drone body 16 or the rotors 20 at the front end 16f of the drone body 16.

When the drone 12 is mounted to the mount 32 in the first way at least a first axial force F1 is necessary to dislodge the drone 12 from the hovercraft body 14, as shown in FIG. 8. When the drone 12 is mounted to the mount 32 in the second way at least a second axial force F2 that is less than the first axial force F1 is necessary to dislodge the drone 12 from the hovercraft body 14, as shown in FIG. 9. This difference can be used for several purposes. For example, the first and second ways of mounting can be selected such that a user can cause the hovercraft 36 to collide with a stationary object (shown at 38) at a selected, attainable speed for the hovercraft, such that the decelerative force of the collision would be sufficient to dislodge the drone 12 when mounted in the second way, but would not dislodge the drone 12 when mounted in the first way to the mount 32. Optionally, when the drone 12 is mounted in the first way to the mount 32, at any speed that is attainable by the hovercraft 36 (under selected conditions, such as on a selected, level support surface with no wind and/or any other suitable conditions), a collision with a stationary object 38 would not produce a decelerative force large enough to dislodge the drone 12 from the hovercraft body 14. Put another way, the first and second clip structures engage each other sufficiently lockingly to prevent dislodging of the drone 12 from the mount when the drone 12 is mounted to the mount in the first way and collides forwardly with the stationary object 38 at any forward speed within a range of forward speeds that the hovercraft 36 is capable of, whereas, when the drone 12 is mounted to the mount in the second way and collides forwardly with the stationary object 38 at at least one forward speed in the said range of forward speeds, the drone 12 is dislodged from the mount.

The drone body 16 may include a self-righting structure, shown at 39, that helps to bring the drone 12 to an upright position (i.e. to the position shown in FIG. 2). The self-righting structure 39 may include, for example, arc members 41 that extend above the bulk of the drone 12 and cooperate with the centre of gravity (shown at CG) of the drone 12 such that a torque T generated by the weight W of the drone 12 when not in an upright position drives the drone 12 towards the upright position, as illustrated in FIG. 4. Any other self-righting structure may alternatively be used to bring the drone 12 to an upright position if it is not upright.

By providing a drone 12 with a self-righting structure such as the self-righting structure 39, a user of the hovercraft 36 can intentionally drive the hovercraft 36 into an obstacle, dislodging the drone 12, and then when the drone 12 has been dislodged and has come to rest on the support surface G in an upright position, the user can fly the drone 12.

Figure 10:
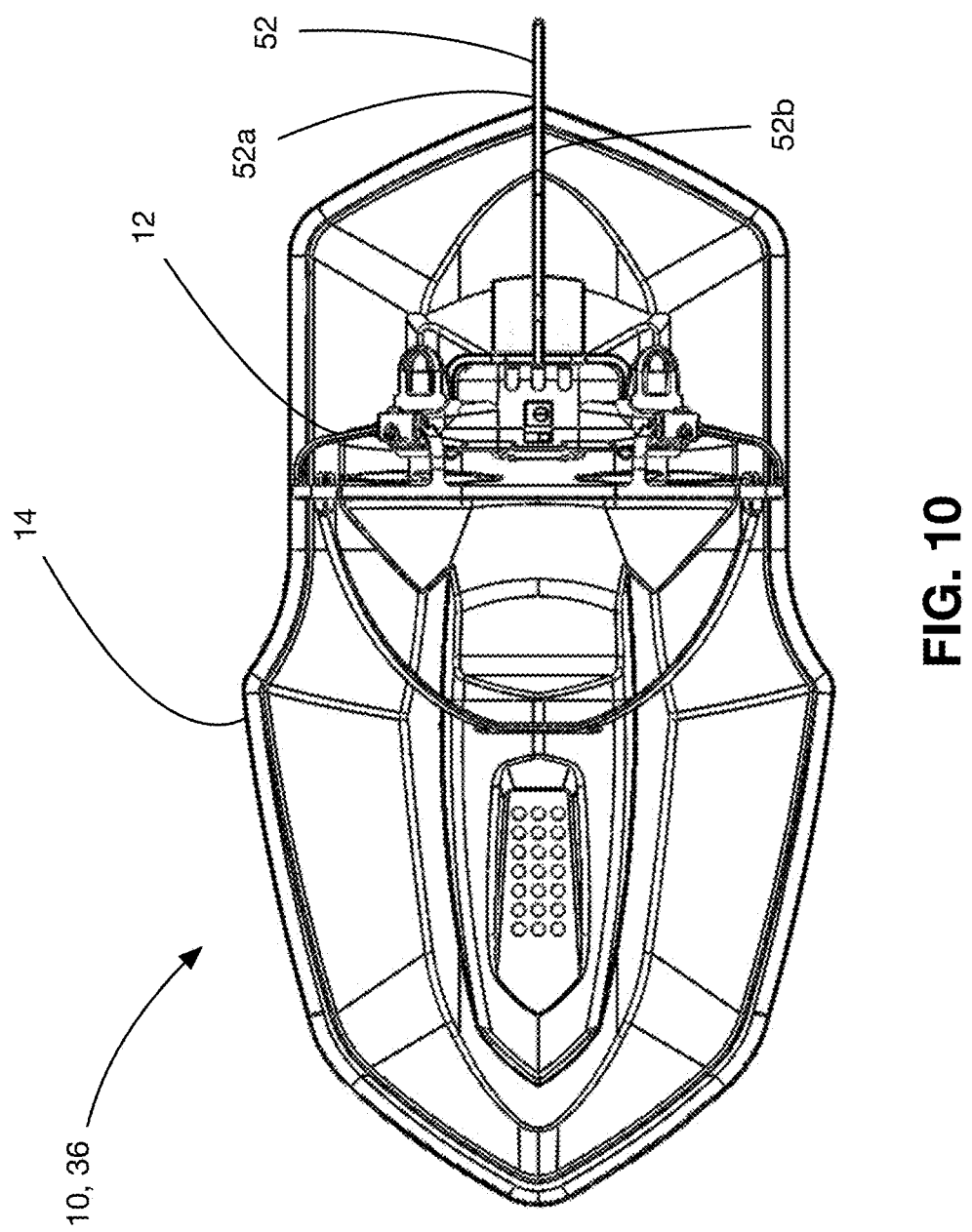
FIG. 10 is a plan view of the hovercraft.

Optionally, the hovercraft body 14 includes a rotor output separation member 52 (FIGS. 1B, 5 and 10) that extends in a vertical longitudinal plane and is positioned aft (preferably immediately aft) of the rotors 20 to at least partially separate the air output of any translation rotors 20 on one side (e.g. the right side) of the hovercraft 36 from the air output of any translation rotors 20 on the other side (e.g. the left side) of the hovercraft 36. This can assist particularly when turning the hovercraft 36. It is theorized that this assistance is provided as a result of a difference in air speed on one side (e.g. first side 52a) of the rotor output separation member 52 as compared to the other side (e.g. second side 52b). More particularly, when it is desired to turn the hovercraft 36 to one side, the controller 22 increases the speed of at least one of the translation rotors 20 on the opposite side of the hovercraft 36 relative to the translation rotors 20 on the said side of the hovercraft 36. For example, if it is desired to turn the hovercraft 36 to the right, the controller 22 may increase the speed of at least one of the rotors 20 on the left side of the hovercraft 36 relative to the rotors 20 on the right side of the hovercraft 36. This increase in rotor speed on the left side of the hovercraft 36 results in a longitudinally oriented force on the left side of the hovercraft 36 that is larger than a longitudinally oriented force on a right side of the hovercraft 36, which results in a net moment M on the hovercraft 36 urging it to rotate towards the right. However, in addition to this, the increase in air speed on one side of the rotor output separation member 52 relative to the air speed on the other side of the rotor output separation member 52. This increase in air speed on one side relative to the other, results in a decrease in air pressure on the side with the higher air speed, and as a result, a lateral force is generated on the rotor output separation member 52 which assists in turning the hovercraft 36. Additionally, the rotor output separation member 52 may act as a vertical stabilizer on the hovercraft 36, thereby helping to keep the hovercraft 36 pointed straight when it is traveling straight forward.

In some embodiments, the controller 22 is capable of driving the two rotors 20b at separate speeds from the rotors 20a. This capability permits the controller 22 to accelerate or decelerate the hovercraft 36 without changing its height off the support surface G, and also permits the controller 22 to change the height of the hovercraft 36 off the support surface G without changing the speed of the hovercraft 36 on the support surface G.

As seen in the passages above, the controller 22 is programmed to drive the plurality of rotors 20 to maintain stable flight of the drone 20 without the hovercraft body 14 connected thereto, and is programmed to drive the first rotor 20a to at least partially lift the hovercraft 36 off the support surface G and to drive the second rotor 20b to propel the hovercraft 36 along the support surface G.

Optionally, the combination 10 includes a remote control 56 as shown in FIG. 12. The remote control 56 is used to transmit signals to the controller 22 to control the operation of the drone 12 or the hovercraft 36 as the case may be. More specifically, the remote control 56 may include a first input member 58 and a second input member 60. In the example shown, the first and second input members 58 and 60 are physical levers. It will be understood, however, that, in some embodiments, the first and second input members 58 and 60 are not physical and are instead virtual (such as, for example, virtual levers on a touch screen). The first and second input members 58 and 60 may have any suitable functions. For example, the first input member 58 may be used to control turning of the drone 12 or the hovercraft 36 and the second input member 60 may be used to control the vertical lift of the drone 12 or the forward speed of the hovercraft 36.

Optionally, the remote control 56 and the controller 22 may be programmed such that actuation of the first input member 58 by a first amount when the drone 12 is separate from the hovercraft body 14 and sitting in a first orientation (e.g. wherein the axes of rotation of the rotors 20 are all at least approximately upright) causes the remote control 56 to signal the controller 22, which in turn causes the controller 22 to adjust speed of the first and the second rotors 20a and 20b differently than actuation of the first input member 58 by the first amount when the drone 12 is connected to the hovercraft body 14 and is sitting in a second orientation that is different than the first orientation (e.g. wherein the axes of rotation of the rotors 20 are all approximately horizontal).

More specifically, the remote control 56 and the controller 22 may be programmed such that: i) actuation of the first input member 58 by the first amount when the drone 12 is separate from the hovercraft body 14 and sitting in the first orientation causes the remote control 56 to signal the controller 22, which in turn causes the controller 22 to adjust speed of the first and the second rotors 20a and 20b to respective first speeds, and ii) actuation of the first input member 58 by the first amount when the drone 12 is connected to the hovercraft body 14 and is sitting in the second orientation causes the remote control 56 to signal the controller 22, which in turn causes the controller 22 to adjust speed of the first and second rotors 20a and 20b to respective second speeds, wherein the second speed of at least one of the first and second rotors 20a and 20b is different than the first speed of said at least one of the first and second rotors 20a and 20b. For example, as has been described above, if movement of the first input member 58 by the first amount is intended to turn the drone 12 clockwise (when being operated as a drone), then, for the first pair 40a of rotors 20, the controller 22 increases the speed of the clockwise spinning rotor (i.e. rotor 20a), while keeping the other rotor (i.e. rotor 20b) at the same speed, and for the second pair 40b of rotors 20, the controller 22 increases the speed of the clockwise spinning rotor (i.e. rotor 20b), while keeping the other rotor (i.e. rotor 20a) at the same speed. By contrast, as has also been described above, if movement of the first input member 58 by the first amount is intended to turn the hovercraft 36 clockwise (when the drone 12 is connected to the hovercraft body 14 and is being operated as a hovercraft), then, for the first pair 40a of rotors 20, the controller 22 increases the speed of both rotors 20a and 20b, while keeping a constant speed for both the rotors 20a and 20b of the second pair 40b of rotors 20.

The controller 22 and/or the remote control 56 may be capable of determining in any suitable way whether the user is operating the drone 12 as a drone or as a hovercraft 36 (and to control the rotor speeds accordingly based on user input via the input members 58 and 60). For example, in the example shown herein, the controller 22 may determine that the drone 12 is to be operated as a drone 12 or as a hovercraft 36 based solely on its orientation (e.g. based on signals from the orientation sensor 24), since the orientation of the drone 12 is different by about 90 degrees when it is positioned to be flown as a drone versus when it is mounted in the mount on the hovercraft body 14.

The hovercraft body 14 has a bottom edge 62 and an outwardly extending lip 64. The bottom edge 62 may be relatively thin so as to have a relatively small contact surface area with the support surface G. The bottom edge 62 may have any suitable width W for this purpose, such as a width of less than about 3 mm and preferably less than about 2 mm. As a result of the small width of the bottom edge 62, in the event that a portion of the bottom edge 62 touches the support surface G during operation of the hovercraft 36, there is relatively less friction than if the contact surface area were larger.

Additionally, the lip 64 extends outwardly and upwardly from the bottom edge 62 so as to assist in permitting the hovercraft 36 to climb over obstacles during movement. If the lip 64 were to extend directly outwardly parallel to the support surface G, then the hovercraft body 14 would tend to get caught on obstacles and wedge itself under some obstacles.

It will be noted that in some embodiments, the drone 12 could mount to the hovercraft body 14 in a way where the drone 12 remains generally upright, and therefore it need not have a different orientation when being mounted to the hovercraft body 14 versus when it is sitting upright on the ground. In such an embodiment, the air blown by the rotors 20a could be transmitted to the ground-facing chamber 28, while the air blown by the rotors 20b could be ducted to the rear of the hovercraft body 14. In such embodiments, the controller 22 could use some input other than drone orientation to determine whether the drone 12 is to be operated as a drone or as a hovercraft. For example, the drone 12 may include a contact sensor that is engaged when the drone 12 is mounted to the hovercraft body 14.

While the embodiment shown in the figures provides a drone 12 with two pairs 40 of rotors 20, it is alternatively possible for the drone 12 to include only two rotors 20. These rotors 20 may correspond to the two rotors 20a in the embodiment shown when the drone 12 would mounted to the hovercraft body 14 such that they would sit side by side and would each blow some air into the ground facing chamber and some air behind the hovercraft 36 to propel the hovercraft along the support surface G. Alternatively these rotors 20 may correspond to the two rotors 20a and 20b in a single pair 40 of rotors 20, such that one rotor would blow air into the ground-facing chamber (and may also blow air behind the vehicle to propel the hovercraft along the support surface G) while the other rotor would not blow air into the ground-facing chamber and would only blow air behind the vehicle to propel the hovercraft along the support surface G.

While it has been disclosed for the drone 12 to be mountable to the hovercraft body 14 in first and second positions, it will be understood that the drone 12 could be mountable into any suitable vehicle body in first and second positions such that a first axial force is required to dislodge the drone 12 when it is mounted in the first way and a second axial force (that is different from the first axial force) is required to dislodge the drone 12 when it is mounted in the second way. Any suitable vehicle body may include, for example, a wheeled vehicle body, a vehicle body on skis or skate blades or any other suitable type of vehicle body.

While the hovercraft body 14 is shown as being an unpowered, non-moving element, it is alternatively possible for the hovercraft body 14 to have elements such as LEDs that are illuminated when may have a motorized element of its own that is moved when the, or may have a motorized element of its own that is moved when the drone 12 is mounted thereto.

In the present disclosure, the term 'flight' is intended to denote travel along all three axes, whereas operation as a hovercraft (wherein it states that the drone 12 at least partially lifts the hovercraft off the support surface G) generally denotes travel substantially along two axes at a height that is closer to the support surface G than occurs during flight.

When it is specified that the travel of the hovercraft is at a height that is closer to the support surface G than occurs during flight, it is intended to include travel wherein the hovercraft touches the support surface during its travel. Such touching of the support surface can occur occasionally, regularly, substantially constantly or not at all.

In some embodiments, the drone 12 may be integrally formed with the vehicle body 14 such that the two are not separable from one another. In such embodiments features unrelated to the concept of separability from one another may be novel and inventive relative to the prior art.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. A combination vehicle system, comprising:
a drone having a plurality of rotors, wherein each of the rotors is motor-driven, wherein the drone further includes a controller that is operatively connected to the plurality of rotors; and
a hovercraft body defining a ground-facing chamber having a hover air inlet, and including a mount for the drone, wherein the drone is removably connectable to the mount in a mounted position so as to form a hovercraft in which a first rotor of the plurality of rotors is positioned in radial overlap with at least a portion of the hover air inlet and is oriented to drive air into the ground-facing chamber through the hover air inlet so as to at least partially lift the hovercraft body off a support surface, and in which a second rotor of the plurality of rotors is positioned without any radial overlap with the hover air inlet and is oriented to drive air to propel the hovercraft along the support surface,
wherein the controller is programmed to drive the plurality of rotors to maintain stable flight of the drone without the hovercraft body connected thereto, and wherein the controller is programmed to drive the first rotor to at least partially lift the hovercraft off a support surface and to drive the second rotor to propel the hovercraft along the support surface, and
wherein the plurality of rotors are substantially co-planar when the drone is connected to the hovercraft body.

2. A combination vehicle system as claimed in claim 1, wherein the hovercraft body is a single layer that has an exterior face, wherein the hover air inlet passes from the exterior face to the ground-facing chamber, and wherein the mount is on the exterior face.

3. A combination vehicle system as claimed in claim 1, wherein each of the rotors is driven by an individually dedicated motor.

4. A combination vehicle system as claimed in claim 1, further comprising a remote control that includes a first input member, wherein the remote control and the controller are programmed such that:
actuation of the first input member by a first amount when the drone is separate from the hovercraft body and sitting in a first orientation causes the remote control to signal the controller, which in turn causes the controller to adjust speed of the first and the second rotors to respective first speeds,
and actuation of the first input member by the first amount when the drone is connected to the hovercraft body and is sitting in a second orientation that is different than the first orientation causes the remote control to signal the controller, which in turn causes the controller to adjust speed of the first and second rotors to respective second speeds, wherein the second speed of at least one of the first and second rotors is different than the first speed of said at least one of the first and second rotors.

5. A combination vehicle system as claimed in claim 1, further comprising a remote control that includes a first input member, wherein the remote control and the controller are programmed such that actuation of the first input member by a first amount when the drone is separate from the hovercraft body and sitting in a first orientation causes the remote control to signal the controller, and in turn causes the controller to adjust speed of the first and the second rotors differently than actuation of the first input member by the first amount when the drone is connected to the hovercraft body and is sitting in a second orientation that is different than the first orientation.

6. A combination vehicle system as claimed in claim 1, wherein the first and second rotors together make up a first pair of rotors, and wherein the drone has a second pair of first and second rotors, wherein, when the drone is in the mounted position on the hovercraft body, the first rotor of each of the first and second pairs of rotors is positioned in radial overlap with at least a portion of the hover air inlet and is oriented to drive air into the hover air inlet so as to at least partially lift the hovercraft off a support surface, and the second rotor of each of the first and second pairs of rotors is positioned without any radial overlap with the hover air inlet and is oriented to drive air to propel the hovercraft along the support surface.

7. A combination vehicle system as claimed in claim 1, wherein the mount includes a first clip structure, and the drone includes a second clip structure, and wherein the mount is shaped to receive the drone in a first way in which the first and second clip structures engage one another to positively hold the drone in place, and is shaped to receive the drone in a second way in which the drone is held in the mount at least substantially only by friction,
wherein, when the drone is mounted in the mount in each of the first and second ways, the drone is operable to at least partially lift the hovercraft off a support surface, and such that a second rotor of the plurality of rotors is positioned without any radial overlap with the hover air inlet and is oriented to drive air to propel the hovercraft along the support surface.

8. A combination vehicle system as claimed in claim 1, wherein the mount includes a first clip structure, and the drone includes a second clip structure, and wherein the mount is shaped to receive the drone in a first way in which the first and second clip structures engage one another to positively hold the drone in place such that at least a first axial force is necessary to dislodge the drone from the hovercraft body, and wherein the mount is shaped to receive the drone in a second way in which the drone is held in the mount at least in part by friction such that at least a second axial force that is less than the first axial force is necessary to dislodge the drone from the hovercraft body,
wherein, when the drone is mounted in the mount in each of the first and second ways, the drone is operable to at least partially lift the hovercraft off a support surface, and such that a second rotor of the plurality of rotors is positioned without any radial overlap with the hover air inlet and is oriented to drive air to propel the hovercraft along the support surface.

9. A combination vehicle system as claimed in claim 8, wherein the first and second clip structures engage each other sufficiently lockingly to prevent dislodging of the drone from the mount when the drone is mounted to the mount in the first way and collides forwardly with a stationary object at any forward speed within a range of forward speeds that the hovercraft is capable of,
and, when the drone is mounted to the mount in the second way and collides forwardly with the stationary object at at least one forward speed in the said range of forward speeds, the drone is dislodged from the mount.

10. A combination vehicle system as claimed in claim 8, wherein the drone body includes a self-righting structure that extends above a centre of gravity of the drone and which cooperates with the centre of gravity of the drone such that a torque generated by the weight of the drone when in a non-upright position is permitted by the self-righting structure to drive the drone towards an upright position.

11. A combination vehicle system as claimed in claim 10, wherein the self-righting structure includes a plurality of arc members that extend above the centre of gravity of the drone and which form a rolling surface for the drone to roll along the support surface with by the torque generated by the weight of the drone.

12. A combination vehicle system as claimed in claim 1, wherein the hovercraft body has a bottom edge and a lip that extends upwards from outwards from the bottom edge.

13. A combination vehicle system, comprising:
a drone having a plurality of rotors, wherein each of the rotors is motor-driven, wherein the drone further includes a controller that is operatively connected to the plurality of rotors; and
a hovercraft body defining a ground-facing chamber and including a mount for the drone, wherein the mount includes a first clip structure, and the drone includes a second clip structure, and wherein the mount is shaped to releasably receive the drone in a first way in which the first and second clip structures engage one another to positively hold the drone in place such that at least a first axial force is necessary to dislodge the drone from the hovercraft body, and wherein the mount is shaped to releasably receive the drone in a second way in which the drone is held in the mount at least in part by friction such that at least a second axial force that is less than the first axial force is necessary to dislodge the drone from the hovercraft body,
wherein, when the drone is mounted in the mount in each of the first and second ways, thereby forming a hovercraft, a first rotor from the plurality of rotors is oriented to drive air into the ground-facing chamber so as to at least partially lift the hovercraft off a support surface, and a second rotor from the plurality of rotors is oriented to drive air to propel the hovercraft along the support surface,
wherein the controller is programmed to drive the plurality of rotors to maintain stable flight of the drone when the drone is disconnected from the hovercraft body, and wherein the controller is programmed to drive the first rotor to at least partially lift the hovercraft off a support surface and to drive the second rotor to propel the hovercraft along the support surface.

14. A combination vehicle system as claimed in claim 13, wherein the first and second clip structures engage each other sufficiently lockingly to prevent dislodging of the drone from the mount when the drone is mounted to the mount in the first way and collides forwardly with a stationary object at any forward speed within a range of forward speeds that the hovercraft is capable of, and, when the drone is mounted to the mount in the second way and collides forwardly with the stationary object at at least one forward speed in the said range of forward speeds, the drone is dislodged from the mount.

15. A combination vehicle system as claimed in claim 13, wherein the drone body includes a self-righting structure that extends above a centre of gravity of the drone and which cooperates with the centre of gravity of the drone such that a torque generated by the weight of the drone when in a non-upright position is permitted by the self-righting structure to drive the drone towards an upright position.

16. A combination vehicle system as claimed in claim 15, wherein the self-righting structure includes a plurality of arc members that extend above the centre of gravity of the drone and which form a rolling surface for the drone to roll along the support surface with by the torque generated by the weight of the drone.

17. A combination vehicle system, comprising:
a drone having a plurality of rotors, wherein each of the rotors is motor-driven, wherein the drone further includes a controller that is operatively connected to the plurality of rotors;
a hovercraft body defining a ground-facing chamber and including a mount for the drone, wherein the drone is removably connectable to the mount in a mounted position so as to form a hovercraft in which a first rotor from the plurality of rotors is oriented to drive air into the ground-facing chamber so as to at least partially lift the hovercraft off a support surface, and in which a second rotor from the plurality of rotors is oriented to drive air to propel the hovercraft along the support surface,
wherein the controller is programmed to drive the plurality of rotors to maintain stable flight of the drone when the drone is disconnected from the hovercraft body, and wherein the controller is programmed to drive the first rotor to at least partially lift the hovercraft off a support surface and to drive the second rotor to propel the hovercraft along the support surface; and
a remote control that includes a first input member, wherein the remote control and the controller are programmed such that actuation of the first input member by a first amount when the drone is separate from the hovercraft body and sitting in a first orientation causes the remote control to signal the controller, and in turn causes the controller to adjust speed of the first and the second rotor differently than actuation of the first input member by the first amount when the drone is connected to the hovercraft body and is sitting in a second orientation that is different than the first orientation.

18. A combination vehicle system as claimed in claim 17, wherein the first and second rotors together make up a first pair of rotors, and wherein the drone has a second pair of first and second rotors, wherein, when the drone is in the mounted position on the hovercraft body, the first rotor of each of the first and second pairs of rotors is positioned in radial overlap with at least a portion of the hover air inlet and is oriented to drive air into the hover air inlet so as to at least partially lift the hovercraft off a support surface, and the second rotor of each of the first and second pairs of rotors is positioned without any radial overlap with the hover air inlet and is oriented to drive air to propel the hovercraft along the support surface.

19. A combination vehicle system as claimed in claim 18, wherein the controller adjusts speed of the first and second rotors differently based on signals from an orientation sensor on the drone.

20. A combination vehicle system as claimed in claim 18, wherein an instruction from the remote control to turn the hovercraft causes the controller to increase speed of at least one rotor on only one of the first and second pairs of rotors, whereas an instruction from the remote control to turn the drone causes the controller to increase speed of at least one rotor on each of the first and second pairs of rotors.

* * * * *